Patented Dec. 11, 1945

2,390,490

UNITED STATES PATENT OFFICE 2,390,490

FILTER POWDER

Thomas C. Atwell, Warren, Pa., assignor to Floridin Company, Warren, Pa., a corporation of Delaware No Drawing. Application May 2, 1945, Serial No. 591,625

2 Claims. (Cl. 252—299)

This invention relates to the preparation of a decolorizing filter aid and more particularly to the treatment of fuller's earth to make it useful for this purpose. The application is a continuation-in-part of my copending application Serial No. 413,369, filed October 2, 1941.

It is an object of the invention to provide a fuller's earth decolorizing filter aid having improved flow rate characteristics while retaining as high an efficiency for decolorizing and fatty acid adsorption characteristics as fuller's earth filter aids now available commercially.

It is the particular object of this invention to provide a fuller's earth decolorizing filter powder for use in the reclamation of dry cleaning fluids to clarify and purify the solvent fluid for reuse. The principal commercially acceptable solvents used in the dry cleaning field with which the invention is operable are the following:

Stoddard solvent—a petroleum naphtha
Carbontetrachloride
Trichloroethylene
Tetrachloroethylene (perchloroethylene)
140° F. flash petroleum solvent It is an equally important object of the invention to provide a decolorizing filter aid which has properties of both an adsorbent and a filter aid, and can be used to treat the following industrial liquids in addition to dry cleaners solvent:

Animal, vegetable, and mineral oils
Shellac
Metallurgical solutions
Adhesives
Cellulose esters
Pharmaceuticals
Fruit juices
Cider
Alcoholic extracts and many others wherever filter aid action, clarification, neutralization, or decolorization can be applied.

The present invention makes available various fuller's earths; e. g., the Georgia-Florida type, the Texas type such as obtained from Riverside, Texas, the Olmstead, Illinois type, and others to accomplish the purposes of filter powders and imparts to the same characteristics which enable the flow rate to be increased from substantially three to five times that formerly obtained, and, in some cases, the improvement in flow rate is even greater. In use, the filter aid may be disposed on a screen or entrained with a flow of the liquid to be treated and collected on a screen, the filtering of the liquid through the layer of the powder and the contact action between the fluid and the powder serving to remove impurities.

A typical example of one manner of preparing and using a finely ground fuller's earth filter powder has been disclosed in the Fitz Simons application, Serial No. 273,146, for Filter powder, filed May 11, 1939. As there shown, the fuller's earth may be crushed and dried to remove all of the free and adsorbed moisture and is further dried to have a water of hydration content less than 6% but not less than 1%. The dried fuller's earth is then subjected to a fine grinding process during which it is pulverized to have a particle size range below 74 microns. It has been found that fuller's earth thus treated has superior decolorizing and fatty acid adsorption characteristics which render it particularly adapted to the reclamation of dry cleaning solvent fluids, although it is also contemplated that such a material may be used for many other purposes.

Fuller's earth processed in this manner is well adapted to this dry cleaning use, because, when the fuller's earth is activated by reducing its water of hydration content to not less than 1% and less than 6%, it is rendered impervious to subsequent swelling when water entrained with the solvent contacts the filter powder. Thus, the filter aid collected on a screen will permit the dry cleaning fluid to pass readily therethrough, unimpeded by the usual swelling and gelatinization which normally follows from the use of fuller's earth in the presence of moisture. Once dried to this water of hydration content, the fuller's earth may be placed in contact with water without detrimental swelling or gelatinization.

While the fuller's earth filter powder above described has superior characteristics in the respects named, improvement in the flow rate of the solvent through the powder collecting on the screen is accomplished by following the steps to be described below.

Flow rate is defined as the quantity of liquid passing through a unit area of the filter aid, per unit thickness per unit pressure differential in a given time. By treating the fuller's earth in the manner of this invention, the flow rate characteristic can be improved materially while, at the same time, retaining its other above-described characteristics as a filter aid.

It is preferred that in addition to the process of treating the fuller's earth here described, that the earth be activated in accordance with the teaching of the co-pending application. This invention is an improvement on that disclosure, and resides in controlling the fine grinding process to control the particle size of the filter aid. It has been found that flow rate is dependent on particle size particularly where there are large percentages of fines smaller than 10 microns. It is the purpose of this invention to provide a method of grinding whereby the proportion of fines may be reduced, so that notwithstanding that all of the fuller's earth is ground to a particle size smaller than 74 microns, the distribution of particle sizes may be controlled to eliminate most of the fines in the ground product less than 10 microns in diameter. The resistance to flow of fluid through the filter powder is inversely proportional to the quantity and size of the fines in the powder. The fewer the fines and narrower the classification, i. e., particle diameter limit, the less will be the resistance. It is apparent, therefore, that the fines should be eliminated to improve the flow rate.

The size of the particles obtained in the fine grinding process is related to the brittleness, the shattering characteristics, and the toughness of the fuller's earth being pulverized. These qualities I find are dependent to a certain extent upon the natural free and combined water content of the fuller's earth, and if the free water content is controlled while the fine grinding process is accomplished, the particle size of the finished product may be made to fall within a certain range. The tendency of the earth to pulverize to a uniform particle size will be found to vary with the variation in the selected quantity of natural free water.

If fuller's earth having a critical natural free water content of between substantially 20 to 40% is subjected to grinding, for example in a Raymond plant size roller mill or other conventional grinding equipment such as a hammer mill or a grinder in which the material is pulverized by feeding it between a stationary disc and a revolving disc, a filter aid results, having an improved flow rate, by reason of the elimination of a substantial proportion of the fines usually found to be present. Above about 40% natural free water content, it becomes difficult and often impossible to grind, for example the Georgia-Florida type fuller's earth. I find that the upper limit of substantially 40% natural free water content is a critical one for all normal practical conditions because above this point, the clay becomes plastic and sticky so that it cannot be properly ground. The optimum free water content is within the range of 20% to 40% natural free moisture content. This range tends to produce the most uniform size in the final product and reduces to a minimum the proportion of fines produced in the pulverizing means. Below 20% free moisture, the proportion of fines tends to increase and the flow rates are so low that the ground earth is of no commercial value.

The criticality of the substantially 20 to 40% free water content is illustrated in the following table showing the effect of free moisture content on flow-rate in the present invention:

*Table I*

| Per cent free water at time of grinding | Flow-rate cc./min. average of four test runs |
|---|---|
| 0 | 9.4 |
| 5 | 13.5 |
| 10 | 20.8 |
| 15 | 31.2 |
| 20 | 48.9 |
| 25 | 70.8 |
| 30 | 104 |
| 35 | 146 |
| 40 | 198 |
| 40+ | (¹) |

¹ Too plastic to grind.
All rates on water. All samples ground to 200 mesh and activated at 800° F. The values are the average of four different runs.

In the above table the free moisture content range has been extended to the limits of grindability which from the table is about 40% free water. It will be noted that the flow-rate increases sharply above 20% free water and continues to rise up to the limit of about 40%. The lower limit of 20% is fixed, due to the fact that the flow rates resulting below this limit are commercially of no value and the upper limit of about 40% is fixed, because at this point the clay becomes plastic and sticky so that it cannot be ground.

To obtain a fuller's earth having 20% to 40% free moisture content, the earth is dried at a temperature below about 250° F. If heated above this degree, a portion of the combined water of hydration will be driven off and the earth upon then being ground will have an undue proportion of fines. After grinding to obtain the desired particle size distribution, in accordance with this teaching, the earth is activated by drying it to a combined or water of hydration content of not less than 1% and less than 6%, so that in addition to the improved flow rate thus obtained, all of the useful properties of the activated fuller's earth of the prior art are preserved.

In the preferred practice of this invention, the raw fuller's earth is subjected to a crushing step to produce a somewhat uniform size of lump. The fuller's earth passes from the primary swing hammer crushing mill to a rotary drier where the fuller's earth is subjected to the drying temperature, which is below about 250° F., until the free moisture content of the earth is reduced to within the 20% to 40% range. The fuller's earth is then pulverized to a particle size below 74 microns, as, for example, with a Raymond mill.

The Raymond mill is the well-known type of pulverizing apparatus in which the material to be pulverized is fed downwardly into a receptacle having a stationary and horizontally disposed grinding ring against the inner periphery of which grinding rollers are forced. The grinding rollers are rotatably mounted on the ends of vertically extending shafts which, in turn, are pivotally mounted on a spider driven by a vertical drive shaft. As the drive shaft is rotated, the crushing rollers will be caused to roll around the inner periphery of the grinding ring and will be forced outwardly by centrifugal force to crush the material between the rollers and the ring. A blast of air is forced upwardly through the ground material, and, as the air stream continues upwardly, it passes through an enlarged chamber where its velocity is greatly reduced, whereby the heavier particles are returned to the grinding means and only the lighter particles are carried over to the further classifying and collecting means.

When fuller's earth, dried to within a range of 20% to 40% natural free moisture, is thereafter subjected to the grinding step in any type of mill, a more uniform particle size and a narrower classification results than if it were ground at a lower moisture content. Due to the control of the natural free moisture content, the fuller's earth can be ground to a size range below 74 microns in which the fines below 10 microns, although not completely eliminated, are greatly reduced. This reduction in fines permits a greatly increased flow rate through the powder and, after the pulverized material has been activated in accordance with the Fitz Simons teaching, an improved filter powder for dry cleaning purposes results. This is accomplished, as above stated, by activating the fuller's earth to have a water of hydration content of not less than 1% and less than 6% after the fine grinding has been performed.

It is desirable in the finished product to be used in the dry cleaning arts that all particles of colloidal size be removed. If not removed, the colloidal particles adhere to the fabrics being cleaned and cause an increase in resistance to flow of fluid through the filter device. Although the performance of fine grinding practice as here taught tends to eliminate the production of colloidal fines, a small proportion of the ground material will be of this size, and thus all fines smaller than 3 microns should be removed.

A typical analysis of a fuller's earth ground in accordance with the present invention (sample A), as compared with the prior art teaching wherein the free moisture content was disregarded in the fine grinding state (sample B), is as follows:

Table II

| Particle diameter in microns | Per cent finer than— | |
|---|---|---|
|  | Sample A— Flow-rate 146 cc./min. | Sample B— Flow-rate 77 cc./min. |
|  | Per cent | Per cent |
| 40 | 100 | 100 |
| 30 | 96 | 96 |
| 25 | 89 | 95 |
| 20 | 71 | 90 |
| 15 | 47 | 69 |
| 10 | 33 | 45 |
| 8 | 28 | 37 |
| 6 | 23 | 28 |
| 4 | 18 | 20 |
| 3 | 16 | 18 |

From an inspection of this analysis, it is evident that the fuller's earth sample A which was dried to have a free moisture content of 20% to 30% before fine grinding has a much larger percentage of larger sized particles than the fuller's earth sample B which was pulverized after the moisture content had been reduced to 1% to 6% water of hydration. It will be noted that sample A has a size range in which over 67% of the particles are larger than 10 microns. Sample B has a much larger proportion of fines, and it will be noted that only 55% of the material has a particle size larger than 10 microns. It is this elimination of the fines which accounts for the larger flow rate, 146 cc./min. per unit area per unit thickness per pressure differential per unit time, as compared with 77 cc./min. for sample B.

In following the present teaching, it is possible to produce a powder having 80% within the particle size range of 10 to 25 microns. A powder having this size range with 100% below 74 microns, has an average flow rate of 160 cc./min. The tremendous gain in flow rate accomplished by this invention is of important commercial value, in that it enables the flow rate to increase substantially over that formerly obtained; e. g., 3 to 5 times or more.

It has been stated that the fuller's earth thus processed is useful for other purposes, and it is suggested that by following the dry grinding process here described and the activation step set forth in the Fitz Simons application, that a superior product will be produced for a number of other filtering uses, such as for decolorizing oils, removing fatty acids from other liquids not attracted to the filter aid, etc.

In certain of such other uses, activation to not less than 1% and less than 6% combined water may not be essential. This drying is performed, primarily, to improve the filter powder for uses where water comes in contact with the powder, the improvement being the avoidance of swelling or gelatinization when water contacts the powder.

While I have mentioned Georgia-Florida, Texas, and Olmstead types specifically, I find that the invention is useful generally for the improvement of fuller's earths for decolorizing filter powders, and regardless of grinding equipment and the crude earths available, has general application to the preparation of high flow rate filter powders from fuller's earth.

I have referred herein to the particular utility of the decolorizing filter powder in the dry cleaning industry. When incorporated in one of the usual solvents, such as above referred to, in which may be also included a detergent such as a soap, the action of the product of this invention is highly efficient both as a filter aid and as a decolorizing agent and precludes the necessity for independent or separate mediums for these purposes. That is, the product of the invention is effective as a filter aid, a purifying and decolorizing agent. For a more complete understanding of the application of the invention in the dry cleaning field, reference is had to "Industrial and Engineering Chemistry," volume 32, page 454, April 1940, in which the customary dry cleaning process and the province of the filter powder is fully described.

I claim:

1. A process for dry grinding fuller's earth to control the distribution of the particle sizes comprising drying the raw earth to have a natural free moisture content of between about 20% to 40%, then grinding the dried earth to a particle size below 74 microns.

2. A process for dry grinding fuller's earth to control the distribution of the particle sizes for use as a decolorizing filter aid in the reclamation of a dry cleaning fluid comprising drying the raw earth to have a natural free moisture content of between about 20% to 40%, then grinding the dried earth to a particle size below 74 microns, and thereafter activating the earth by drying it to have a water of hydration content of from not less than about 1% to less than 6%.

THOMAS C. ATWELL.